Nov. 13, 1928.

C. H. KYRKLUND 1,691,292

CULTIVATOR SHOVEL STRUCTURE

Filed July 8, 1926

Inventor
Carl Herman Kyrklund
By his Attorneys
Williamson Reif & Williamson

Patented Nov. 13, 1928.

1,691,292

UNITED STATES PATENT OFFICE.

CARL HERMAN KYRKLUND, OF WINTHROP, MINNESOTA.

CULTIVATOR-SHOVEL STRUCTURE.

Application filed July 8, 1926. Serial No. 121,243.

Like reference characters refer to the same parts throughout the different views, and in which, Fig. 1 is a view in front elevation of a common form of cultivator shovel and holder as now ordinarily used;

Figure 1:
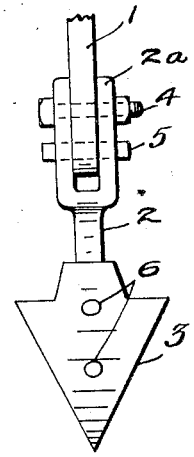
Figure 2:
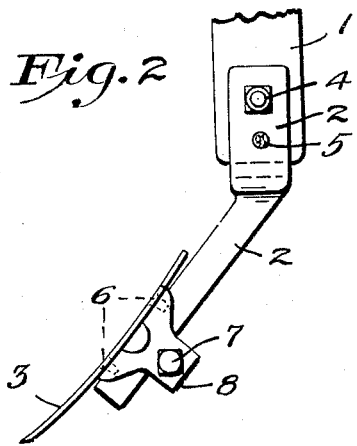
Fig. 2 is a view in side elevation of the device shown in Fig. 1.

Referring to the drawing, particularly Figs 1 and 2, a member 1 is shown which will be carried by the frame or beam of a cultivator and extends downward therefrom. An arm 2 is provided having a forked or bifurcated upper end 2ª adapted to embrace the lower end of member 1 and bolted thereto by the headed and nutted bolt 4. A pin 5 which will be made of wood or some fragile material, also extends through the portion 2ª and the member 1, being disposed below the bolt 4. The arm 2 is shown as having a portion rectangular in cross section extending downwardly and forwardly from the lower end of member 1, which portion passes through a clamp or shoe 8 which is held thereon by the bolt 7. The shoe 8 has secured thereto by the countersunk rivets 6 the cultivator shovel or share 3.

With the construction shown it is seen that the shovel 3 is in front and rear alinement with the arms 2 and that the rear surface of the shovel 3 is disposed very close to the arms 2, as shown in Fig. 2. With this construction, grass, stubble, roots and any rubbish that is in the land will move upward along the shovel and hang on the arm 2 so that an obstruction is formed and the dirt and any other objects cannot ride upwardly over the shovel until the obstruction is removed by hand. This removal is frequently necessary. The accumulation on the arm 2 by preventing the free upward movement of the soil over the shovel prevents the proper scouring on the face of the shovel.

In accordance with the present invention, the member 1 is provided with an arm 2' having a forked or bifurcated upper portion 2'ª which embraces the lower end of member 1 and is secured thereto by the headed and nutted bolt 4'. A pin of wood or other fragible material 5' is also shown passing through portion 2'ª and member 1, which pin is similar to the pin 5 above described. The arm 2' has a portion 2'ᵇ shown as of rectangular shape in cross section extending downwardly and forwardly substantially from the bottom of member 1 and said arm is provided with another portion 2'ᶜ which is inclined forwardly and slightly downwardly but makes quite an angle with the portion 2'ᵇ. The arm 2' also has a terminal portion 2'ᵈ extending downwardly and forwardly and at an angle to the portion 2'ᶜ, the portion 2'ᵈ being substantially parallel to the portion 2'ᵇ. The portion 2'ᵈ extends through the clamp or shoe 8' being held thereon by the bolt 7' and the shovel or shoe 3' is secured to the shoe 8' by the countersunk screws or rivets 6'. It will also be seen from Fig. 1 that the portion 2'ᵇ extends laterally at an angle to the portion 2'ª so that the portion 2'ᵇ is not only offset forwardly but is also offset laterally.

Figure 3:
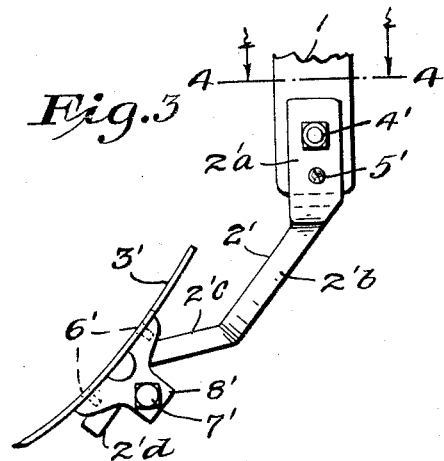
Fig. 3 is a view in side elevation of a cultivator structure of the present invention.
Figure 4:
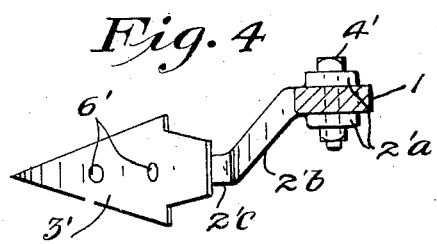
Fig. 4 is a vertical section taken on the line 4—4 of Fig. 3, as indicated by the arrows.

With the structure shown in Figs. 3 and 4 it will be seen that the rear surface of shovel 3' is spaced from the arm 2 or its portion 2'ᵇ. The shovel is also laterally disposed relatively to the member 1 and the portion 2'ª of arm 2'. With such a structure, when grass, stubble, roots or other objects pass upwardly over the shovel 3' they will not immediately engage the arm 2' but will have space to drop between the shovel and arm. The shovel and arm being offset, as shown in Fig. 1, these objects will drop down at one side of the portion 2'ᵇ and thus will not collect to form an obstruction on the arm 2' or shovel 3'. The small grain thus always passes freely over the front surface of the shovel 3' and the same will be effectively scoured, as desired. There being no obstruction on the shovel the soil will not be retarded and stick to the shovel, as is the case with the construction shown in Figs. 1 and 2. Furthermore, the weeds, stubble, grass and roots which drop in the rear of the shovel will fall at one side of the arm 2' and be in position to be effectively covered up by the shovel or mold board as the cultivator moves through the ground. This is an additional advantage in applicant's construction.

From the above description it is seen that applicant has provided a very simple and efficient structure of shovel or mold board attachment whereby accummulation will not occur on the shovel or its holding means but the soil and other objects will pass over the shovel and drop freely to the ground where they will be in position to be covered. The cultivator or plow of the present invention therefore not only operates better and more easily but does much better work than the structures heretofore used. The invention is quite simple and can be applied to practically all cultivators, it being only necessary to substitute applicant's arm 2' for the arms previously used. The invention has been amply demonstrated in actual practice and found to be very successful and efficient.

It will, of course, be understood, that various changes may be made in the form, details, arrangement and proportions of the device without departing from the scope of applicant's invention, which, generally stated, consists in a device capable of carrying out the objects above set forth, in the novel parts and combinations of parts disclosed and defined in the appended claims.

What is claimed is:

1. A cultivator having a shovel supporting member, an arm secured at one end of said member and extending downwardly and forwardly therefrom, said arm having a lower terminal portion, offset forwardly from its upper portion, said lower portion being also offset laterally from said upper portion and a shovel secured to said lower portion whereby said shovel is spaced forwardly from the upper portion of said arm and is offset laterally in relation to said supporting member.

2. A cultivator or plow having a downwardly extending share supporting member, an arm secured at its upper end to said member, said arm extending forwardly and downwardly from said member and extending laterally from said member, said arm having a terminal portion which is offset forwardly from its intermediate portion, and a share secured to said terminal portion.

3. A cultivator having a shovel supporting member, an arm having an upper portion extending downwardly and forwardly from said member and having an upwardly bent portion intermediate its ends having a terminal portion extending substantially parallel to said upper portion and a shovel secured to said terminal portion whereby said shovel is spaced forwardly from said upper portion.

4. A cultivator or plow having a share supporting member, an arm secured to said member and extending downwardly therefrom and being bent forwardly and laterally, and a share secured to the lower end of said arm, said share being spaced forwardly from the upper end of said arm and out of alinement forwardly and rearwardly with said downwardly extending portion of said arm, whereby the objects and soil passing over said share can drop in the rear thereof.

In testimony whereof I have signed my name to this specification.

CARL HERMAN KYRKLUND.